US010357992B2

(12) United States Patent
Van Dewerker

(10) Patent No.: US 10,357,992 B2
(45) Date of Patent: Jul. 23, 2019

(54) METHOD AND SYSTEM FOR CREATING VIRTUAL LIGHT SCULPTURE ART IMAGES

(71) Applicant: John Stephen Van Dewerker, Ventura, CA (US)

(72) Inventor: John Stephen Van Dewerker, Ventura, CA (US)

( * ) Notice: Subject to any disclaimer, the term of this patent is extended or adjusted under 35 U.S.C. 154(b) by 339 days.

(21) Appl. No.: 15/417,779

(22) Filed: Jan. 27, 2017

(65) Prior Publication Data

US 2017/0217246 A1 Aug. 3, 2017

Related U.S. Application Data

(60) Provisional application No. 62/289,849, filed on Feb. 1, 2016.

(51) Int. Cl.

*B44C 3/06* (2006.01)
*B23K 37/04* (2006.01)
*B23K 11/22* (2006.01)

(52) U.S. Cl.

CPC .................................... *B44C 3/06* (2013.01)

(58) Field of Classification Search

CPC ........... B23K 35/22–386; B23K 37/04; B23K 11/22; B23K 11/24–252; H05B 3/0009; H05B 3/40; H05B 3/54; H05B 7/00; H05B 7/18; B44C 3/06

USPC ................ 219/162, 121.16–121.17, 121.37; 241/23–24.14

See application file for complete search history.

(56) References Cited

U.S. PATENT DOCUMENTS

| | | | | |
|---|---|---|---|---|
| 3,457,625 A * | 7/1969 | Wanamaker | A63H 33/22 | |
| | | | 156/247 | |
| 4,578,131 A * | 3/1986 | Hawkins, Jr. | B44C 3/025 | |
| | | | 156/59 | |
| 4,714,188 A * | 12/1987 | Flynn | B23K 31/00 | |
| | | | 228/120 | |
| 4,927,504 A * | 5/1990 | Scala | C25D 9/08 | |
| | | | 205/120 | |
| 5,741,140 A * | 4/1998 | Bristol | B44C 3/06 | |
| | | | 434/82 | |
| 8,350,189 B1 * | 1/2013 | Waybrant | B44C 3/00 | |
| | | | 219/137 PS | |
| 2015/0174687 A1 * | 6/2015 | Galela | H01L 31/022466 | |
| | | | 219/86.7 | |

* cited by examiner

*Primary Examiner* — Michael A Laflame, Jr.
(74) *Attorney, Agent, or Firm* — Plager Schack LLP; Mark H. Plager; Kara Verryt

(57) ABSTRACT

A process for creating an abstract art image may include forming a wire sculpture from conductive electrical wire; mounting the wire sculpture in a framework; operatively connecting the wire sculpture to a power supply having a voltage and a current necessary to melt the wire sculpture; starting the power on the power supply to slowly melt the wire sculpture; and photographing the melting wire sculpture over an extended time period.

9 Claims, 2 Drawing Sheets

METHOD AND SYSTEM FOR CREATING VIRTUAL LIGHT SCULPTURE ART IMAGES

RELATED APPLICATION

This application claims priority to provisional patent application U.S. Ser. No. 62/289,849 filed on Feb. 1, 2016 entire contents of which is herein incorporated by reference.

BACKGROUND

The embodiments herein relate generally to creating art, and more particularly, to a system and process for creating abstract art.

Traditionally, abstract art photography captures and documents only the image displaced in the view finder during the time of exposure, and the resulting photograph is merely a representative copy of that visible real world scene and not an artistic abstraction of that observable scene. Thus, conventional photographs and scenes are easily reproducible.

Therefore, what is needed is a system and method for creating abstract art that is an induced natural phenomenon not viewable at the time of, or during, the photograph exposure, resulting in a piece of art that is viewable only after the photographic exposure.

SUMMARY

Some embodiments of the present disclosure include a process for creating an abstract art image may include forming a wire sculpture from conductive electrical wire; mounting the wire sculpture in a framework; operatively connecting the wire sculpture to a power supply having a voltage and a current necessary to melt the wire sculpture; starting the power on the power supply to slowly melt the wire sculpture; and photographing the melting wire sculpture over an extended time period.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

In the following detailed description of the invention, numerous details, examples, and embodiments of the invention are described. However, it will be clear and apparent to one skilled in the art that the invention is not limited to the embodiments set forth and that the invention can be adapted for any of several applications.

The method and system of the present disclosure may be used to create abstract art and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

1. Camera
2. Wire Structures
3. Support Framework
4. Electrical Power Supply
5. Optional Movement Control The various elements of the device of the present disclosure may be related in the following exemplary fashion. It is not intended to limit the scope or nature of the relationships between the various elements and the following examples are presented as illustrative examples only.

Figure 1:
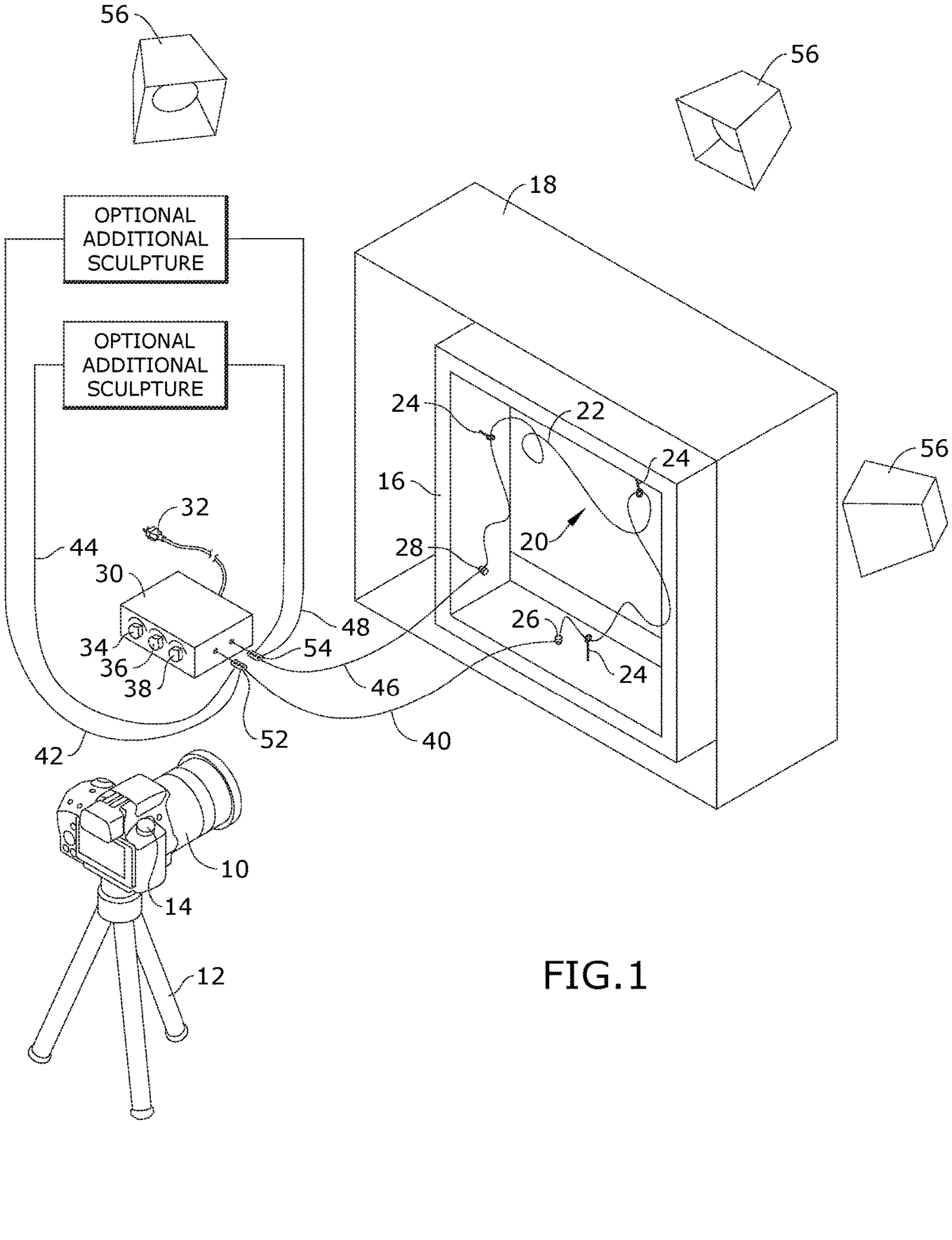
FIG. 1 is a schematic view of one embodiment of the present disclosure.
Figure 2:
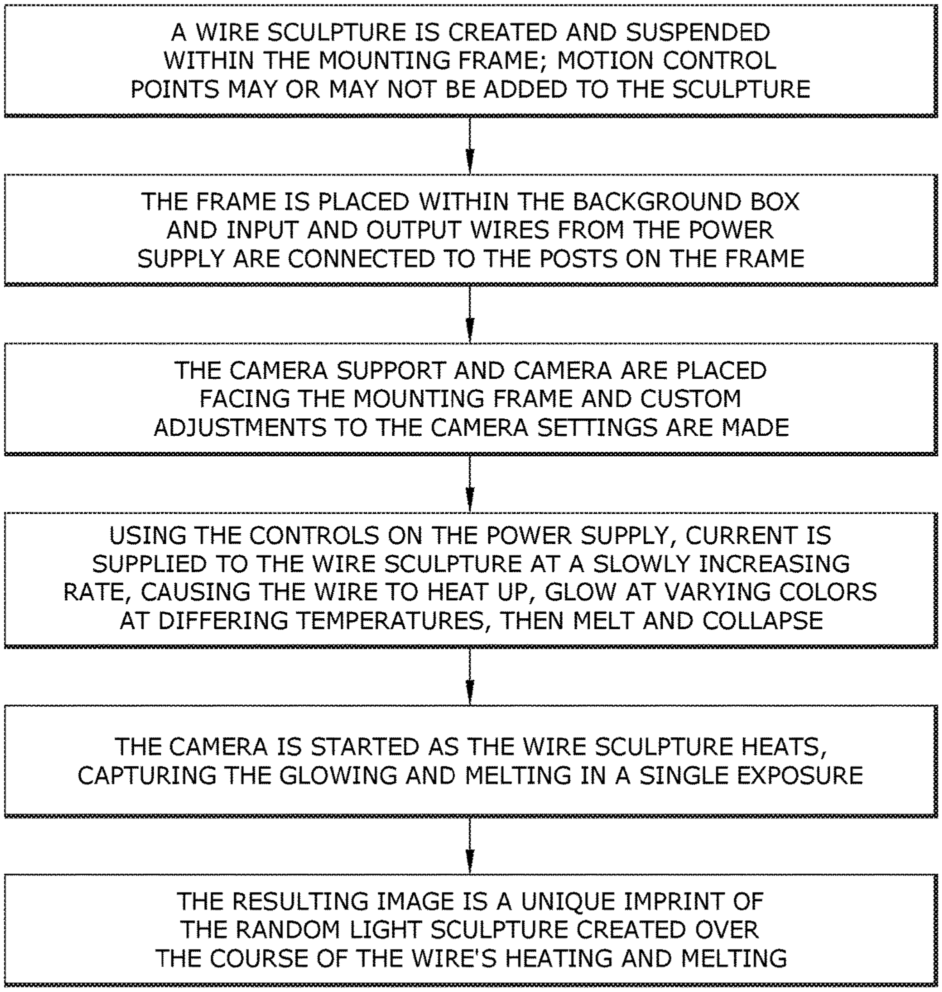
FIG. 2 is a flowchart of one embodiment of the present disclosure.

By way of example, and referring to FIGS. 1 and 2, some embodiments of the present disclosure include a method and system for creating abstract art, the method comprising photographing a melting wire sculpture 20 using extended time photography to capture an abstract image. In more detail, the method may comprise fabricating a wire sculpture mounting framework 16, wherein the framework 16 may comprise, for example, a box with one open side and an internal surface being covered by non-reflective black paint or fabric. Alternatively, the framework 16 may have an open front and an open back, and the framework 16 may be placed within a background box 18, wherein the background box 18 has an inner surface covered by a non-reflective or reflective material. The method may further comprise creating an artistic wire sculpture 20 using conductive electrical wire 22; suspending the artistic wire sculpture 20 within the framework 16; operatively attaching the wire sculpture 20 to a power supply 30 using, for example an input wiring connection 28 and an output wiring connection 40, wherein the power supply 30 is capable of providing voltage and current necessary to melt the conductive electrical wire 22; positioning a camera 10 to point at the framework 16, wherein the camera 10 may be supported by a camera support 12, such as a tripod; setting desired camera settings 14 with studio lights 46 illuminated, and adjusting the camera 10 exposure times, f stops, ISO, and focus on the wire sculpture 20; slowly increasing the power source output until the wire sculpture 20 begins to glow a visible red; and starting the camera 10 exposure time an increasing the power supply output until the wire structure becomes a very hot, flowing red, then yellow, and ultimately melting and collapsing during the camera 10 exposure time.

Some embodiments of the method of the present disclosure may further comprise operatively attaching a motion controller to motion control points 24 positioned on the framework 16. The motion control points 24 may also be attached to the wire sculpture 20, such that when the wire control points 24 move, the wire sculpture 20 also moves. As a result, the wire sculpture may slowly move or rotate while suspended within the framework 16. In embodiments including the motion control points 24, the motion control may be started before the camera is started to capture the moving sculpture 20 in the photography process.

In embodiments, the wire sculpture 20 may not make any contact with itself when suspended within the framework 16. The wire sculpture 20 may simply comprise a wire 22 formed into a desired shape. In other embodiments, however, the wire sculpture 20 may comprise a wire 22 formed into a desired shape along with short, fusible conductive links inserted into the sculpture 20, wherein the links may cause intended breaks during the meltdown at predetermined locations for additional image control.

Some embodiments may include using more than one wire sculpture 20, wherein the wire sculptures 20 may be made of the same or different materials, such that the wire sculptures 20 melt at the same or different rates.

As shown in FIG. 1, the power supply 30 may be attached to the wire sculpture 20 by an input wire 42 and an output wire 40. The power supply 30 may be capable of providing variable waveform AC or DC voltage and current necessary to melt the wire 22. A user may be able to adjust the voltage and current using a DC current control knob 34, an AC current control knob 36, and a current wave form controller knob 38 on the power supply 30 to further induce wire movement in an ambient magnetic field to enhance image detail.

In embodiments, the components of the system of the present disclosure, such as the framework 16 and the background box 18 (when included), may be made of any suitable or desired materials. Suitable materials may include those that are non-conductive, such as wood. Some embodiments may not use the background box 18, but instead may use another surface, such as a wall. Additionally, the wire 22 to be used may depend on the desired effect. Wire length, gauge size, and metal composition may affect the end work produced. Examples of suitable wire materials include stainless steel, copper, brass, and the like.

In some embodiments, the process may include taking multiple images and editing the images in a post-image creation process. After the exposure time has completed, the photographer or user may view the created art in either the viewfinder (in the case of a digital camera) or on developed film (in the case of a film camera). Because the resulting abstract art is a product of extended time photography of a melting wire, the resulting images may not be reproducible by any other means. Thus, the resulting images may be solely unique and difficult to impossible to recreate or copy.

FIG. 2 summarizes an embodiment of the method of the present disclosure. As described therein, the method of creating the artwork may include creating and suspending a wire sculpture 20 in a framework 16; optionally attaching motion control points 24 to the wire sculpture 20; optionally placing the framework 16 within a background box 18; attaching an input wire 42 from a power supply 30 to an input wiring connection 28 on the wire sculpture 20, and attaching an output wire 20 from the power supply 30 to an output wiring connection 26 on the wire sculpture; placing a camera 10 facing the framework 16, wherein the camera 10 is optionally placed on a camera support 12; adjusting controls on the camera 10 and starting the camera 10; supplying current to the wire sculpture 20 using controls on the power supply 30, wherein the current is applied at a slowly increasing rate; and manipulating the amount, time, and waveform of the current, causing the wire 22 to heat up, glow at varying colors, and move in an ambient earth magnetic field or in an artist induced magnetic field, until the wire 22 melts and collapses. The resulting photographic images may be a unique imprint of the random light sculpture created over the course of the wire's heating and melting.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A process for creating an abstract art image, the process comprising:

forming a wire sculpture from conductive electrical wire;

mounting the wire sculpture in a framework;

operatively connecting the wire sculpture to a power supply having a voltage and a current necessary to melt the wire sculpture;

starting the power on the power supply to slowly melt the wire sculpture; and photographing the melting wire sculpture over an extended time period.

2. The process of claim 1, wherein the wire sculpture further comprises conductive links.

3. The process of claim 1, further comprising connecting the wire sculpture to a motion controller such that the wire sculpture moves as it is melting.

4. The process of claim 1, further comprising placing the framework within a background box.

5. The process of claim 4, wherein the background box has a non-reflective inner surface.

6. The process of claim 1, further comprising manipulating the amount, time, and waveform of the current, causing the wire sculpture to heat up, glow at varying colors, and move in a magnetic field.

7. The process of claim 6, wherein the magnetic field is a member selected from the group consisting of an ambient earth magnetic field and an artist induced magnetic field.

8. The process of claim 1, further comprising mounting a plurality of wire sculptures within the framework.

9. The process of claim 1, further comprising:

taking multiple images using a camera; and editing the images in a post-image creation process.

* * * * *